(12) United States Patent
Itani et al.

(10) Patent No.: US 7,589,766 B2
(45) Date of Patent: Sep. 15, 2009

(54) SELECTABLE THRESHOLD MULTIMODE GAIN CONTROL APPARATUS AND METHOD FOR SETTING MUTUALLY CONTINUOUS ANALOG, DIGITAL, AND SHUTTER GAIN LEVELS

(75) Inventors: Nadi R. Itani, Austin, TX (US); Caiyi Wang, Austin, TX (US); David R. Welland, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 1012 days.

(21) Appl. No.: 10/659,472

(22) Filed: Sep. 10, 2003

(65) Prior Publication Data

US 2004/0046875 A1    Mar. 11, 2004

Related U.S. Application Data

(62) Division of application No. 09/075,348, filed on May 8, 1998, now Pat. No. 6,650,364.

(51) Int. Cl.
*H04N 5/235* (2006.01)
*H04N 5/238* (2006.01)

(52) U.S. Cl. .................... 348/229.1; 348/363
(58) Field of Classification Search ........... 348/229.1, 348/363
See application file for complete search history.

(56) References Cited

U.S. PATENT DOCUMENTS

| | | | | |
|---|---|---|---|---|
| 5,534,916 A | * | 7/1996 | Sakaguchi | 348/222.1 |
| 5,657,077 A | * | 8/1997 | DeAngelis et al. | 348/157 |
| 5,982,424 A | * | 11/1999 | Simerly et al. | 348/229.1 |
| 6,100,928 A | * | 8/2000 | Hata | 348/229.1 |
| 2002/0118291 A1 | * | 8/2002 | Ishigami et al. | 348/311 |

* cited by examiner

*Primary Examiner*—Sinh Tran
*Assistant Examiner*—Hang H Lam
(74) *Attorney, Agent, or Firm*—Steven Lin, Esq.

(57) ABSTRACT

A selectable threshold multimode gain control apparatus and method for a charge coupled device (CCD) or CMOS imaging system includes an automatic gain control (AGC) circuit which continuously controls gain in said CCD system to produce a mutually continuous combined target gain level. A processing system for an imager device includes a camera system for producing an imager signal, a correlated double sample (CDS) circuit for receiving data from an imager, a variable gain amplifier (VGA), an analog-to-digital converter (ADC) coupled to said CDS circuit, a digital gain circuit (DGC) coupled to said ADC, and an automatic gain control (AGC) circuit coupled to said DGC for controlling the CDS circuit and the DGC, as well as shutter timing for shutter gain.

18 Claims, 15 Drawing Sheets

SELECTABLE THRESHOLD MULTIMODE GAIN CONTROL APPARATUS AND METHOD FOR SETTING MUTUALLY CONTINUOUS ANALOG, DIGITAL, AND SHUTTER GAIN LEVELS

CROSS REFERENCE TO RELATED APPLICATIONS

This application is a divisional application of U.S. patent application Ser. No. 09/075,348 filed May 8, 1998 now U.S. Pat. No. 6,650,364 entitled "Selectable Threshold Multimode Gain Control Apparatus and Method for Setting Mutually Continuous Analog, Digital, and Shutter Gain Levels" having inventors Nadi Rafik Itani, Caiyi Wang, and David R. Welland and is related to patent application Ser. Nos. 09/075,382; 09/075,491; 09/075,506; 09/075,449; 09/075,446, respectively entitled "Image Processor Circuits, Systems, and Methods" having inventors Sandra Marie Johnson, Shih-Chung Chao, Nadi Rafik Itani, Caiyi Wang, Brannon Craig Harris, Ash Prabala, Douglas R. Holberg, Alan Hansford, Syed Khalid Azim, and David R. Welland, from which U.S. divisional application Ser. No. 10/107,892 was filed on Mar. 27, 2002; "Digital Camera Signal Processor and Method" having inventors Syed Khalid Azim, Shih-Chung Chao, Brannon Craig Harris, and Ash Prabala, which is now abandoned; "Pipelined Analog-to-Digital Converter (ADC) Systems, Methods, and Computer Program Products" having inventors Sandra Marie Johnson and David R. Welland, which issued as U.S. Pat. No. 6,169,502 on Jan. 2, 2001; "High Voltage Input Pad System and Method" having inventors Douglas R. Holberg, Nadi Rafik Itani, and David R. Welland, which issued as U.S. Pat. No. 6,038,116 on Mar. 14, 2000 and from which U.S. continuation application Ser. no. 09/433,812 was filed on Nov. 3, 1999 and issued as U.S. Pat. No. 6,285,536 on Sep. 4, 2001; and "Histogram-Based Automatic Gain Control Method and System for Video Applications" having inventors Nadi Rafik Itani, Caiyi Wang, and David R. Welland; each of these applications filed on even date herewith, and each incorporated herein by reference in its entirety.

BACKGROUND OF THE INVENTION

1. Field of the Invention

This invention relates to automatic gain control and more particularly to automatic gain control in hybrid analog and digital camera and imaging systems.

2. Description of Related Art

Conventionally, gain control in camera and imager devices and systems is subject to considerable technical limitations which make it difficult to use current cameras for professional and consumer applications. In particular, gain control is undertaken with an analog system or with a digital system, lacking integrated controls which are effective for both the analog as well as the digital portions of a combined camera system. There is a need to separately control gain over the analog and digital subsystems.

SUMMARY OF THE INVENTION

According to the present invention, a signal processing system (SPS) for an imager device having a settable shutter includes a digital gain circuit, an analog gain circuit, a shutter gain circuit, and an automatic gain control (AGC) circuit, for controlling the digital, analog, and shutter gain blocks. According to the present invention, gain control of a signal processing system for an imager device includes an automatic gain control (AGC) circuit for controlling multimode levels of gain provided to selected gain modules of the camera system. According to one embodiment of the present invention, an automatic gain control (AGC) circuit includes a gain splitter circuit for receiving gain values which have been determined. The gain splitter circuit produces distributed gain values from the received gain values. The distributed gain values include shutter gain values for an imager device or CCD camera, as well as analog or VGA gain values, and digital gain values. According to another embodiment of the present invention, the AGC circuit provides at least a minimum level of chip gain, which is settable, and which is then divided into analog or VGA gain values and digital gain values. According to another embodiment of the present invention, the AGC circuit provides selectable threshold multimode gain control according to which chip gain values are provided between a user-selectable minimum gain value and a maximum level which is user-selectable. According to the present invention, the total gain is continuous across the thresholds of minimum shutter gain and minimum chip gain. Gain change according to the present invention is incremental according to predetermined gain step sizes. As total gain is increased beyond the user-established maximum shutter gain value, the incremental change in gain is performed in substantially the same gain step sizes. Accordingly, subsequent gain increases beyond the shutter maximum gain is accomplished with another gain mode, i.e., the analog or VGA gain mode, and remains user-transparent or invisible. Similarly according to the present invention, as total gain is increased beyond the maximum analog or VGA gain value, the incremental change in gain is performed in substantially the same gain step sizes. Accordingly, subsequent gain increases beyond the analog or VGA maximum gain are accomplished with another gain mode, i.e., the digital gain, and remains user-transparent or invisible. Shutter gain according to the present invention accordingly can be increased monotonically from zero to a user-settable shutter gain level threshold. The total maximum gain is additionally user-settable, and if the current automatic gain level exceeds the shutter gain maximum, the excess thereover is provided as chip gain, beyond any already established or set minimum chip gain level. Similarly, if the current automatic gain level exceeds the sum of the shutter gain maximum and the analog or VGA gain maximum, then additional gain is provided as digital chip gain up to a user-settable total maximum gain. According to the present invention, total chip gain is increasable substantially continuously without breach, in predetermined level steps across mode thresholds at which gain continues to progress, beyond which one or more particularized gain types cannot increase.

DETAILED DESCRIPTION OF THE PREFERRED EMBODIMENTS

Figure 1A:
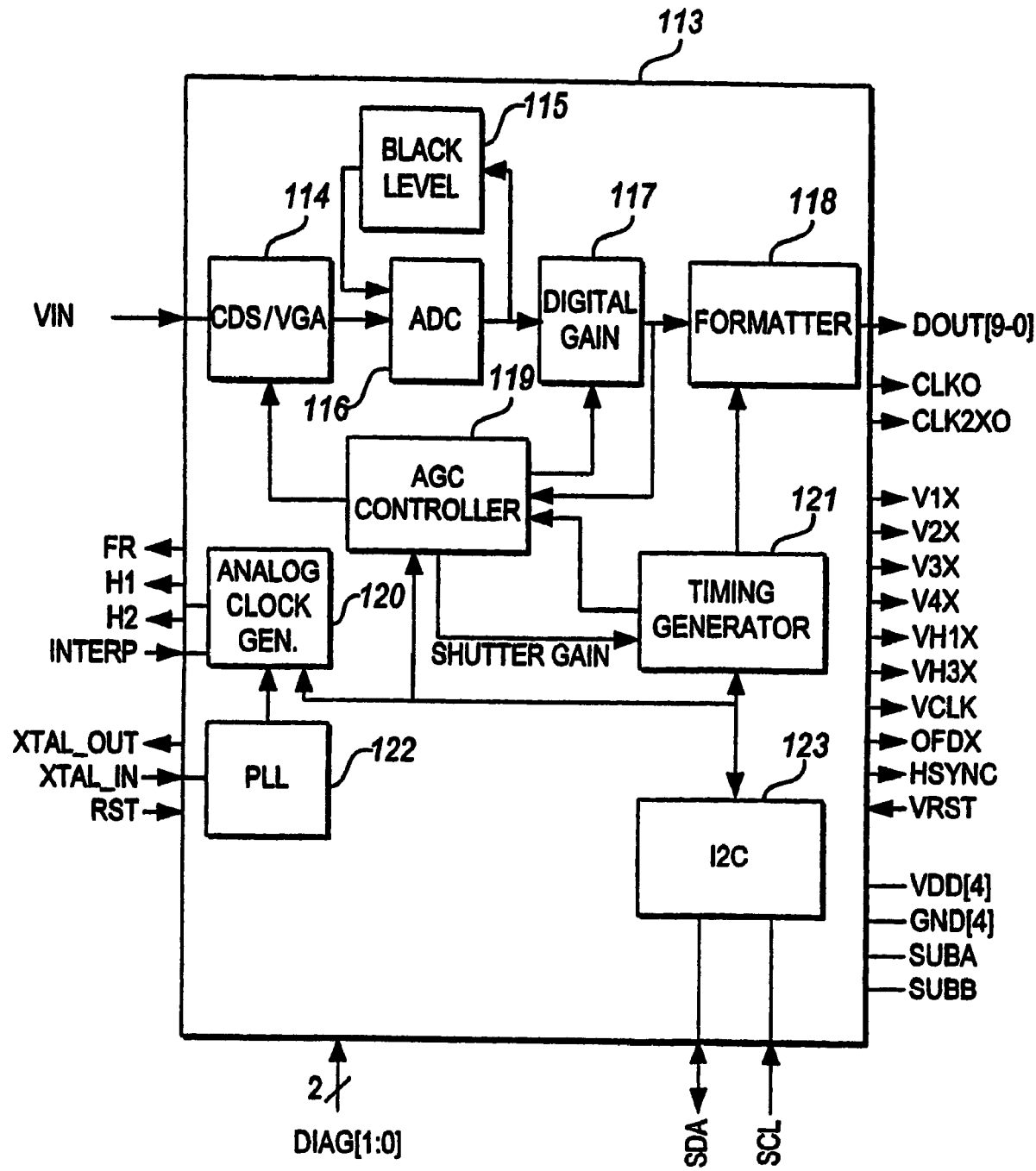
FIG. 1A is a block diagram of an automatic gain control circuit according to the present invention.

Referring now to Figure 1A, there is shown a block diagram of an analog image processing system (AIPS) 113 including an automatic gain control (AGC) controller circuit 119 for controlling a correlated double/sample variable gain amplifier (CDS/VGA) circuit 114 and digital gain circuit 117. Digital gain circuit 117 is connected at its input to analog-to-digital converter (ADC) 116 and at its output to formatter 118. AIPS 113 additionally includes an analog clock generator circuit 120, a timing generator circuit 121, a phase lock loop (PLL) circuit 122, and an I2C bus interface circuit 123. AGC controller circuit 119 controls digital gain circuit 117 and CDSVGA circuit 114 and the timing for OFD pulses (shutter gain). PLL circuit 122 contributes to control of analog clock generator circuit 120. Timing generator circuit 121 provides timing signals to formatter circuit 118.

Figure 1B:
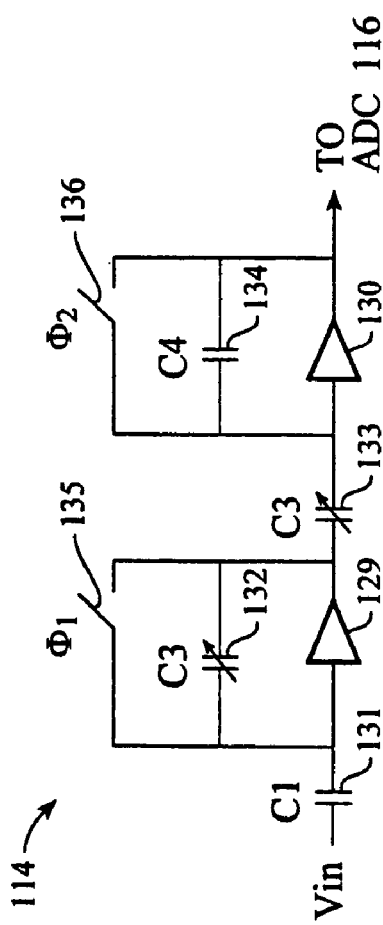
FIG. 1B is a circuit diagram of a CDS/VGA circuit (CC) according to one embodiment of the present invention.

Referring now to FIG. 1B, there is shown a circuit diagram of a CDS/VGA circuit (CC) 114 according to the present invention. In particular, CC 114 includes first and second series connected amplifiers respectively 129 and 130, first through fourth capacitors respectively 131-134 and C1-C4, and first and second switches respectively 135 and 136 which open and close according to clock signals respectively (φ1 and φ2 in order to obtain a correlated sample of an input waveform VIN which is shown in more detail in FIG. 1C. More particularly, according to one embodiment of the present invention, capacitor C1 is connected to the input of amplifier 129 which in turn is connected at its output to capacitor 133 which in turn is connected to the input of amplifier 130. Amplifier 129 is connected in parallel with capacitor 132 and switch 135. Similarly, amplifier 130 is connected in parallel with capacitor 134 and switch 136. According to another embodiment of the present invention, capacitors 132 and 133 are variably settable with an analog (VGA) gain signal from AGC controller 119.

Figure 1C:
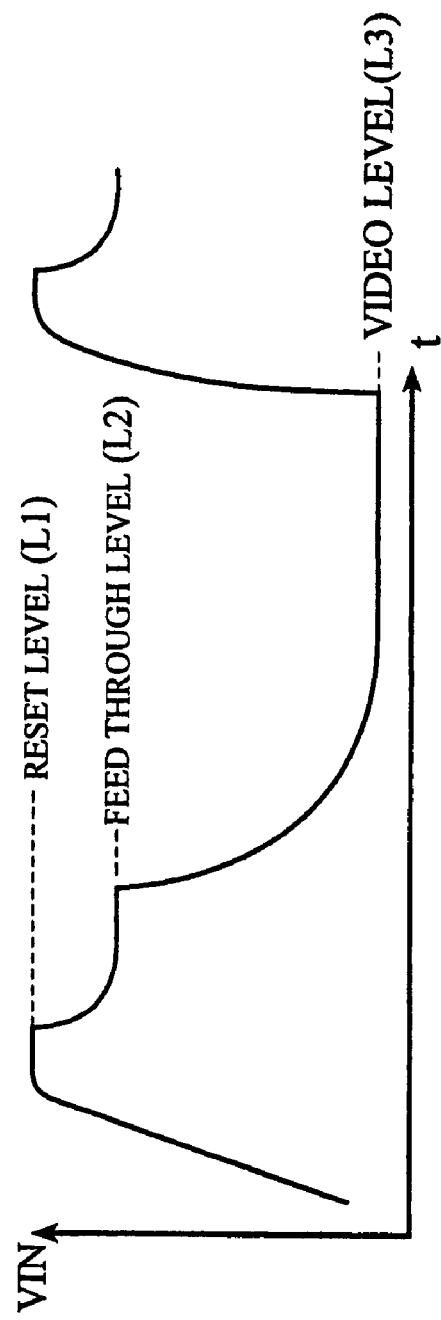
FIG. 1C is a graph of a typical waveform of VIN as a function of time which can be received from a CCD camera.

Referring now to FIG. 1C, there is shown a graph of a typical waveform of VIN as a function of time which can be received from a CCD camera. In particular, the typical form of VIN includes first through third levels respectively L1-L3. Correlated double sampling permits sampling of a difference between levels L2 and L3 to eliminate the noise which is shared at the two levels.

Figure 2:
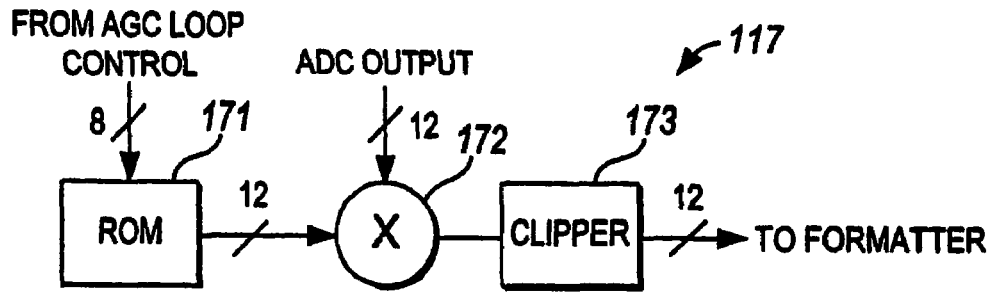
FIG. 2 is a block diagram of a digital gain control circuit according to one embodiment of the present invention.

Referring now to FIG. 2, there is shown a block diagram of a digital gain circuit 117 according to one embodiment of the present invention. Digital gain circuit 117 according to one embodiment includes a read-only-memory (ROM) 171, a multiplier 172, and a clipper circuit 173. ROM 171 stores selected gain values for use as a multiplicand by multiplier 172. ROM 171 is connected to multiplier 172 which in turn is connected to clipper circuit 173. The digital gain is used in conjunction with the analog gain provided through CDS/VGA 114 to supply a substantial controllable range of automatic gain adjustment. According to one embodiment of the present invention, the digital gain portion of the AGC is engaged only after the analog gain has been employed and an additional level of gain is desired. According to one embodiment of the present invention, the digital gain is engaged after the entire analog gain has been deployed. Digital gain provides an additional 0 to 18 dB of gain at 0.074 dB gain steps.

Figure 3:
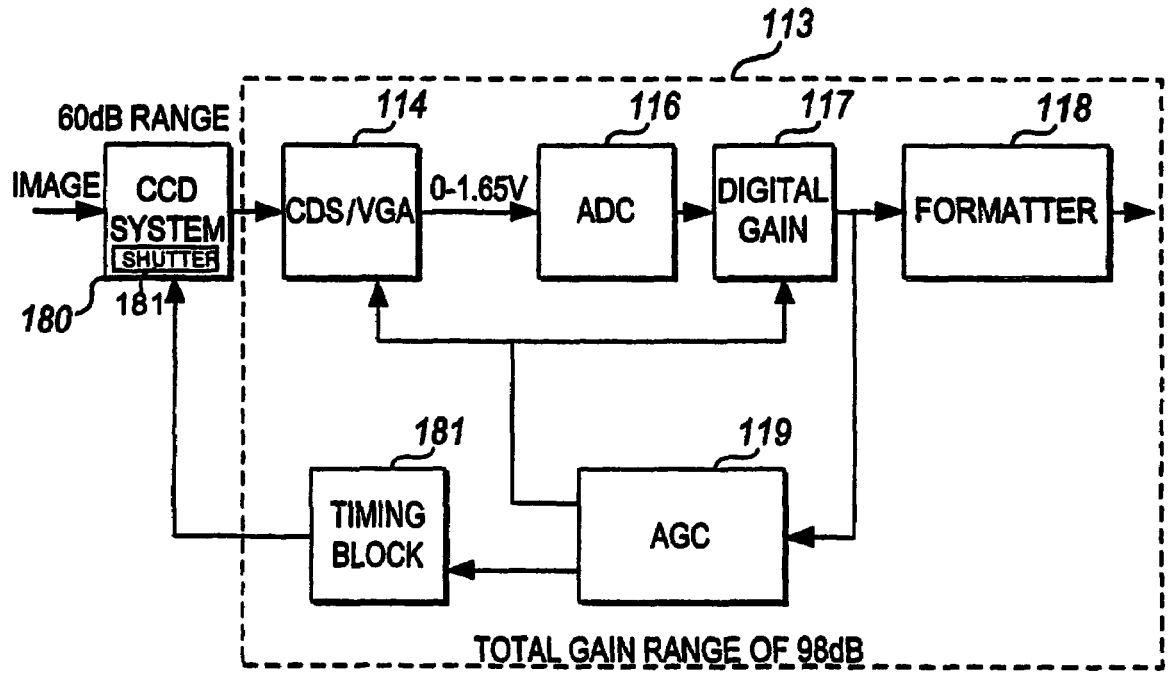
FIG. 3 is a block diagram of a camera system connected to an analog image processing system (AIPS) which is configured according to the present invention.

Referring now to FIG. 3, there is shown a block diagram of a camera system 180 connected to an analog image processing system (AIPS) 113 which is configured according to the present invention. The imager signal is subject to external gain applied through the shutter speed setting of the camera system 180, through an analog internal chip gain provided by CDS/VGA 114, and through digital gain circuit 117. A selected image is input to camera system 180, where a 60 dB gain adjustment potential can be exercised by changing the shutter speed of camera system 180. This 60 dB range is applied when there is too much light. The gain brings the video level to a good operating range. The input signal from CCD system 180 goes to a correlated double sample/variable gain amplifier (CDS/VGA) circuit 114 where low frequency noise is removed and a selected analog gain level is applied. The signal is then subject to a chip gain in a range up to approximately 38 dB in the CDS/VGA circuit 114 and digital gain circuit 117. This gain is used to boost dark images to a proper signal level. After a received signal is digitized by ADC 176, it is applied through an AGC control circuit 119 to set a selected level of gain according to the present invention, in analog and/or digital gain portions. The total digital gain range applicable by digital gain circuit 117 is about 18 dB according to one embodiment. The total gain range of the chip and shutter is approximately 90 dB, which is enough to cover a substantial range of lighting conditions indoors and outdoors, as well as physical and hardware variations. Formatter circuit 118 according to the present invention takes the ADC output, clips received data to a range from binary "0000 0001 00" to binary "111 1110 11" and adds special end-of-video (EAV) and start-of-video (SAV) codes to each video line according to the present invention. The output of formatter circuit 118 is available at the pins DOUT<9:0>, causing transitions to be made at the falling edges of the pixel rate clock CLKO. Timing block circuit 181 causes CCD system 180 to shift data out during successive horizontal line periods. The data provided is shifted from the horizontal shift register of CCD system 180 at the imager output pin, one pixel at a time. Timing circuit 181 creates the required driving signals to control the timing operations of CCD system 180. The timing signals particularly enable shifting data out of CCD system 180 are H1, H2 [=not(H1)], and FR.

Figure 4:
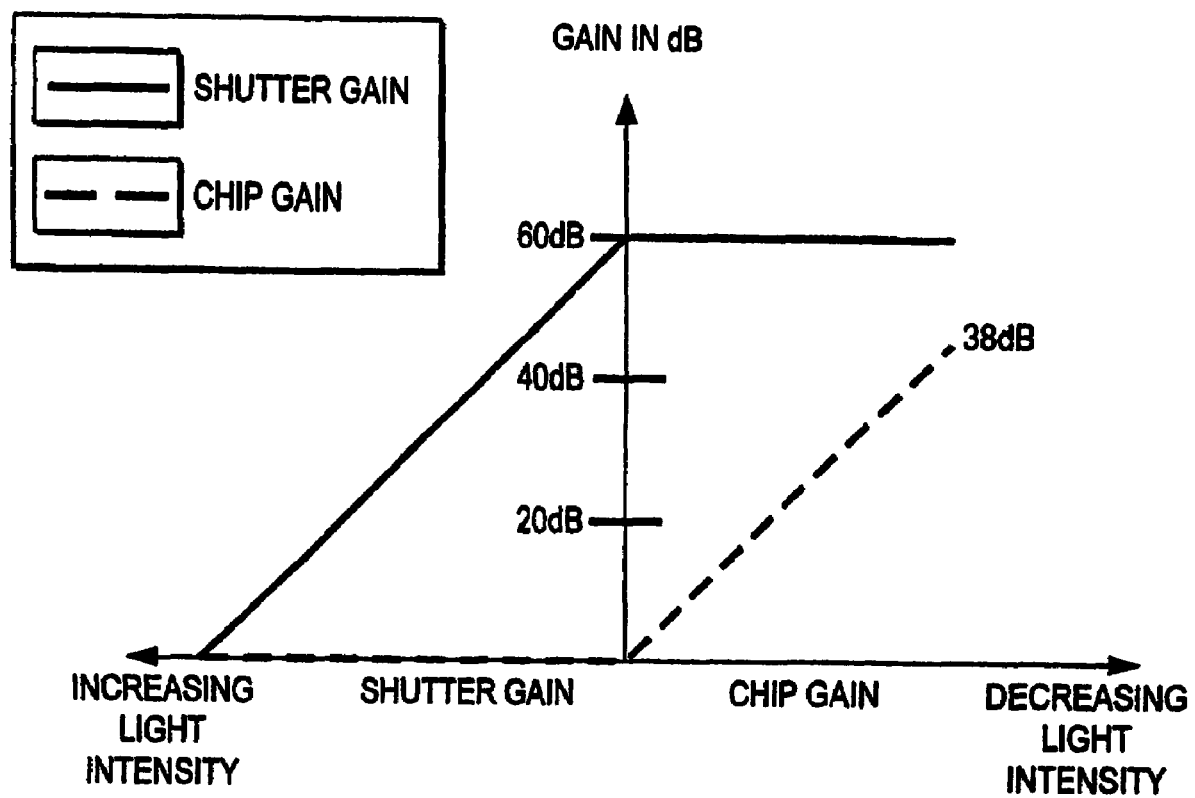
FIG. 4 is a diagram of gain control versus light intensity for shutter gain and chip gain according to the present invention.

Referring now to FIG. 4, there is shown a diagram of gain control versus light intensity for shutter gain and chip gain according to the present invention. In particular, a graph of an automatic gain control method according to the present invention shows a predetermined level of gain is applied by AGC control circuit 119 acting selectively through timing block circuit 181 upon CCD system 180, CDSVGA circuit 114, and digital gain circuit 117, to establish selected gain levels at a given light intensity. Gain is applied in the following order for light intensity varying from low to high: first with shutter gain to the extent possible, in incremental steps, for example, and then with chip gain applied through CDS/VGA circuit 114 and digital gain 117. According to the present invention, gain is applied by first and second gain steps by using up the gain in the block closest to the input first (shutter gain) and then proceeding to a next gain block (the chip gain) once the complete shutter gain has already been applied. This improves the signal to noise ratio (SNR) according to the present invention. According to one embodiment of the present invention, the gain is split between both blocks seamlessly to ensure that the end of one gain region coincides with the beginning of the next gain region, and according to one embodiment each gain block has approximately equal gain steps.

Figure 5A:
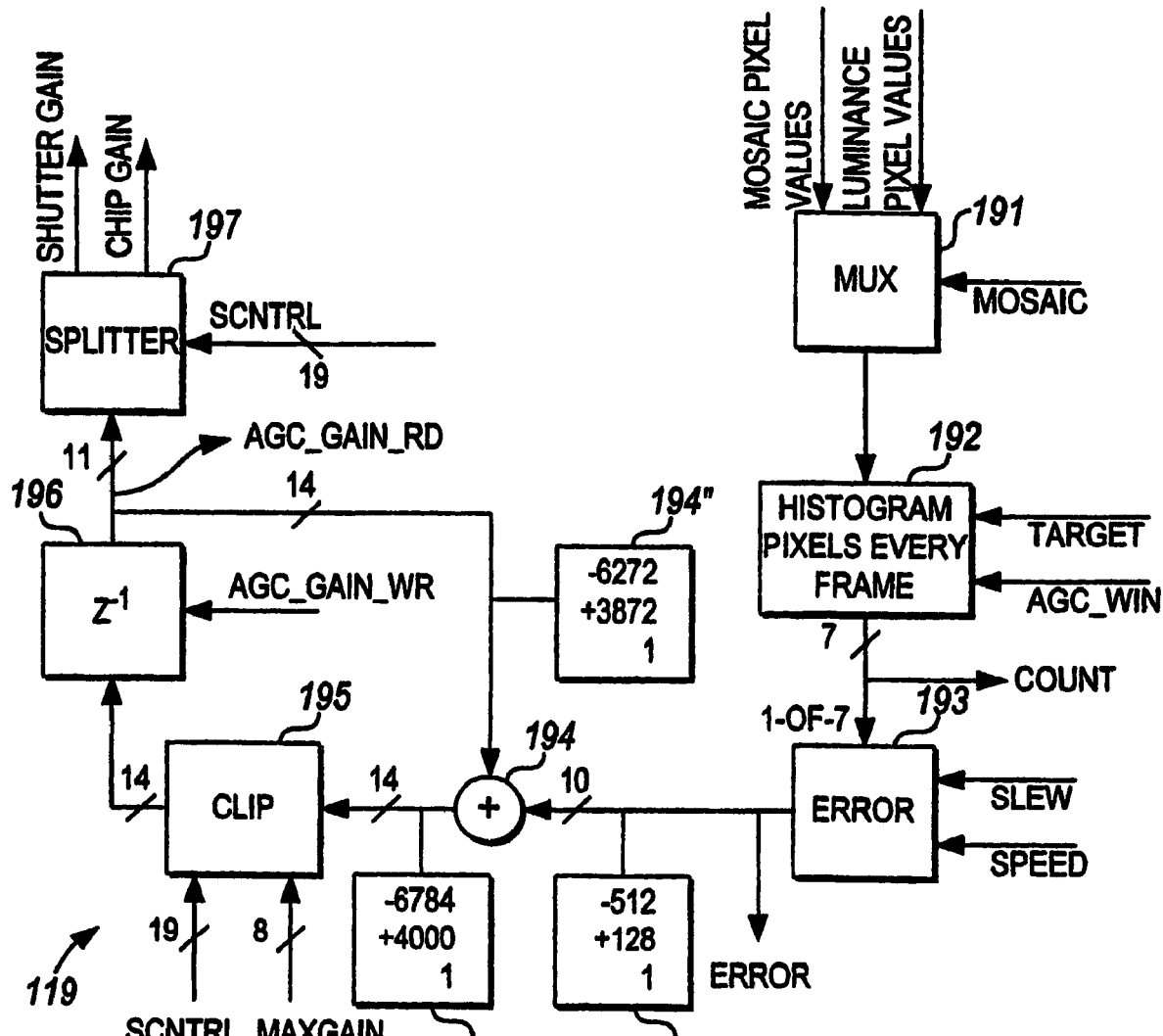
FIG. 5A is a block diagram of an automatic gain control circuit for an analog data processing subsystem according to another embodiment of the present invention.

Referring now to FIG. 5A, there is shown a block diagram of an automatic gain control (AGC) circuit 119 according to one embodiment of the present invention. In particular, AGC circuit 119 includes a multiplexer (MUX) 191 configured to receive input mosaic pixel values and luminance pixel values subject to control line settings of a signal line MOSAIC, permitting selection of whether mosaic pixel values or luminance pixel values are to be provided to histogram circuit 192. AGC circuit 119 further includes a histogram circuit 192 subject to control signals TARGET and AGC_WIN, an error circuit 193 connected to histogram circuit 192, a summation element 194 connected to error circuit 193, a clip circuit 195 connected to summation element 194, a unit delay element 196 connected to the clip circuit 195, and a splitter circuit 197 connected to the unit delay element 196 effective for producing a shutter gain signal and a chip gain signal to control relative gain settings according to the present invention. The output of unit delay element 196 provides a selected gain subject to a gain input provided from clip circuit 195 subject to explicitly written override values AGC_GAIN_WR. AGC circuit 119 receives pixel values of either mosaic or luminance style and generates a histogram of the received data for successive full frames according to the present invention. Based on the contents of the histogram, image brightness levels to be selected are determined, causing an AGC value to be incremented, decremented, or left unchanged for each frame. Histogram circuit 192 stores frame data into histogram bins as discussed further below. Error circuit 193 takes the histogram information and generates an error code that either increments or decrements or does not change the output AGC gain value. Summing element 194 accumulates the AGC value in view of an error signal from error circuit 193, and clip circuit 195 clips the result to insure that it is within a predetermined gain range. Splitter circuit 197 takes received gain values and distributes them to an appropriate gain block including shutter and chip gain circuits.

Figure 5B:
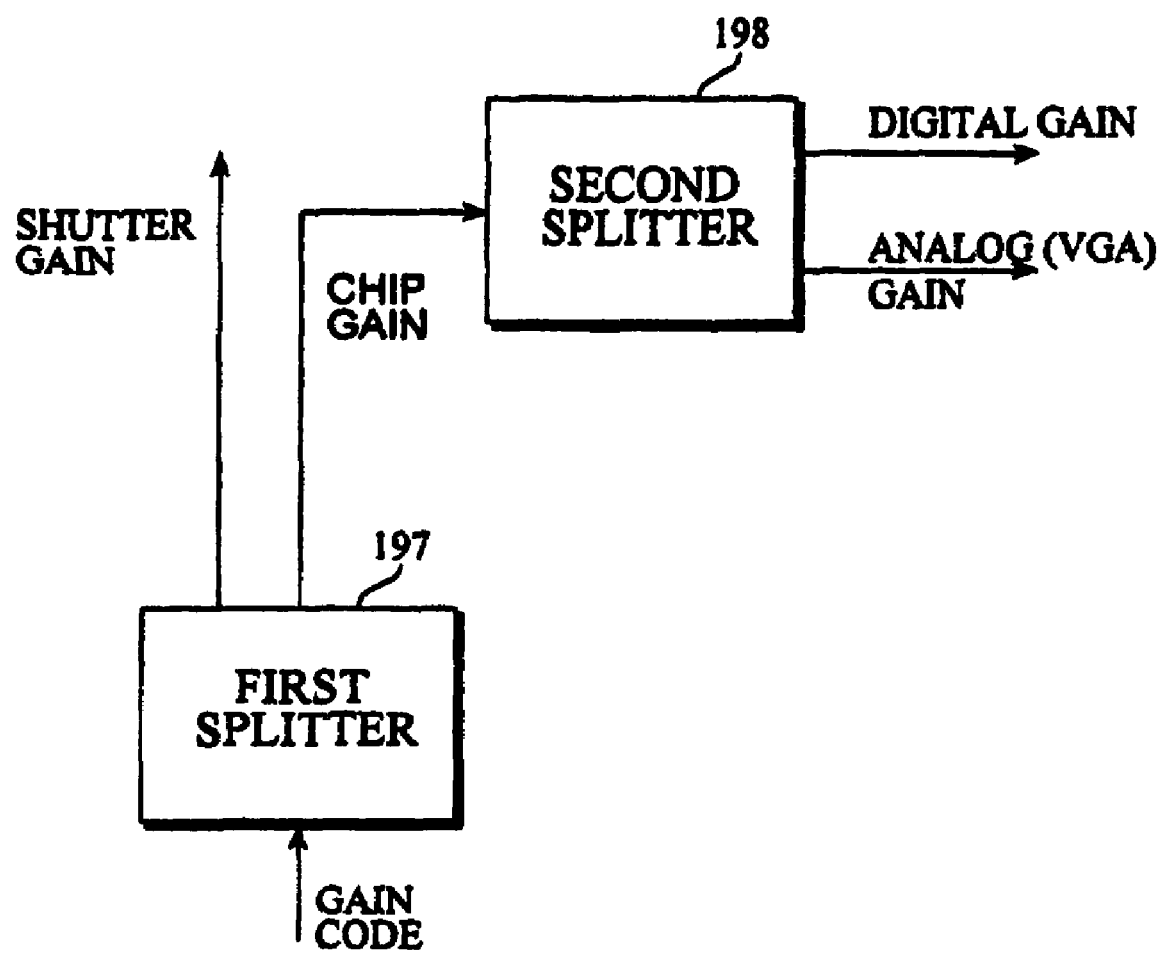
FIG. 5B is a block diagram of first and second splitters according to one embodiment of the present invention.

Referring now to FIG. 5B, there is shown a block diagram of first and second splitters according to one embodiment of the present invention. In particular, first splitter 197 divides input received gain values and produces shutter gain values and chip gain values. The chip gain value is provided in code form to second splitter 198 to produce a digital gain code value and an analog (VGA) gain code value for each received chip gain value produced by first splitter.

Figure 5C:
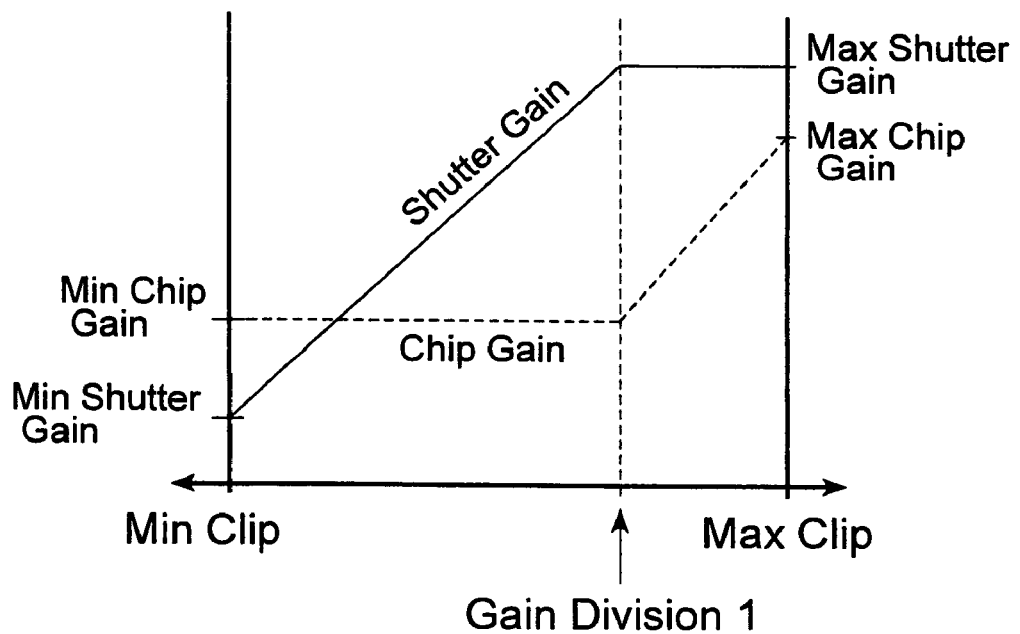
FIG. 5C is a diagram of AGC gain according to one embodiment of the present invention, showing a first gain division between chip and shutter gain.

Referring now to FIG. 5C, there is shown a diagram of AGC gain according to one embodiment of the present invention, showing a first gain division between chip and shutter gain. The AGC circuit 119 sends a gain code to the first splitter 197, which is between the maximum and minimum chip values. First splitter 197 operates by determining whether the AGC gain is above or below a gain division 1. If the AGC gain is below gain division 1, than the shutter gain is set to a gain value between maximum shutter gain and minimum shutter gain that corresponds to the AGC gain code. The chip gain for the case in which the AGC gain is below division 1 is set to minimum chip gain. When the AGC gain is above gain division 1, the chip gain is set to a gain value between minimum chip gain and maximum chip gain that corresponds to the AGC gain. The shutter gain, for the case in which AGC gain is above the gain division 1, is set to maximum shutter gain. Incremental changes in AGC gain below gain division 1 cause shutter gain to change at a certain rate of shutter gain to AGC gain code, while the chip gain is held constant. Incremental changes in the gain of the AGC above gain division 1 cause the chip gain to change at a predetermined rate of chip gain to AGC gain code, while the shutter gain is held constant. In one case according to the present invention, maximum shutter gain, minimum chip gain, and maximum chip gain are all programmable or user settable values. Changing these values will alter the operational characteristic between the transition point at which the shutter gain changes its slope from some gain rate to zero, and where the chip gain changes from a slope of zero to some positive gain rate always occurs at gain division 1. The rate of change in the shutter gain and the rate of change in the chip gain are approximately equal according to one embodiment of the present invention. This causes the crossing over of gain division 1 to be seamless, continuous, and unnoticed by the user.

Figure 5D:
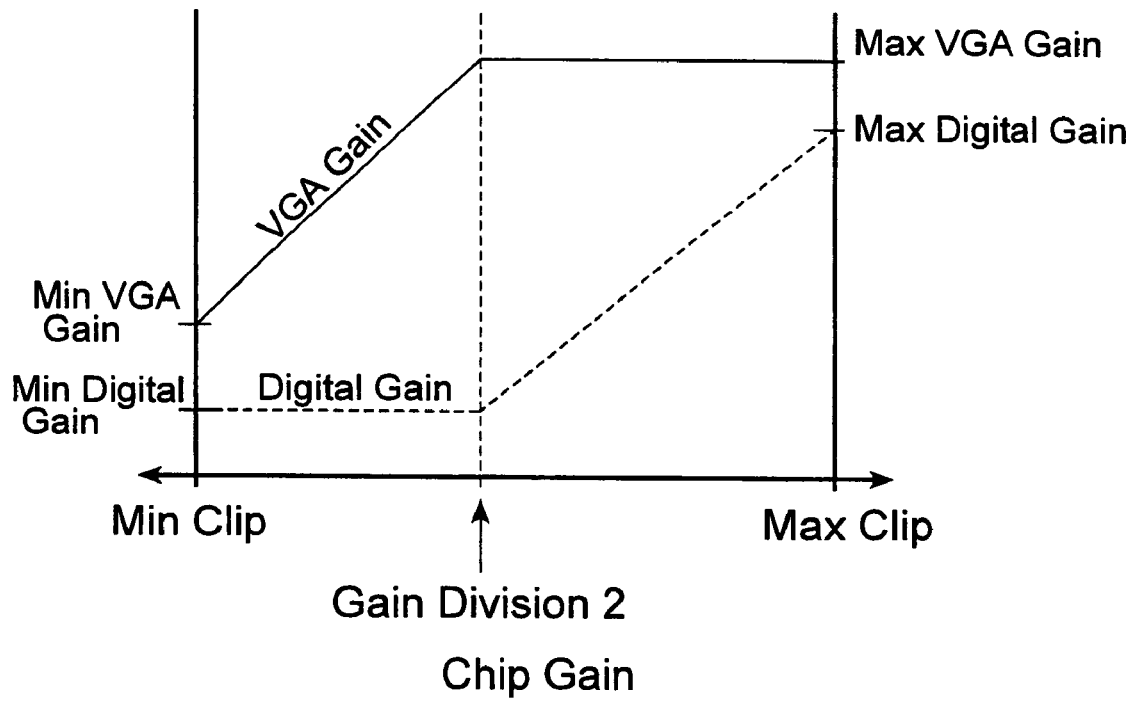
FIG. 5D is a diagram of chip gain according to one embodiment of the present invention, showing a second gain division, i.e., the division between analog (VGA) gain and digital gain.

Referring now to FIG. 5D there is shown a diagram of chip gain according to one embodiment of the present invention, showing a second gain division, i.e., the division between analog (VGA) gain and digital gain. The first splitter 197 sends a second gain code (i.e., a chip gain code) to the second splitter 198 which is between maximum and minimum chip gain values. Second splitter 198 operates by determining whether the chip gain is above or below a second gain division 2. If the gain is below gain division 2, then the VGA gain is set to a value between minimum VGA gain and maximum VGA gain that corresponds to the chip gain code. The digital gain, for the case in which the gain is below gain division 2, is set to minimum digital gain. When the VGA gain is above gain division 2, the digital gain is set to a gain value between minimum digital gain and maximum digital gain that corresponds to the chip gain. The VGA gain, for the case in which the chip gain is above gain division 2, is set to maximum VGA gain. Incremental changes in chip gain below gain division 2 cause the VGA gain to change at a certain rate of VGA gain to chip gain code, while the digital gain is held constant. Incremental changes in the chip gain above gain division 2 cause the digital gain to change at a predetermined rate of digital gain to chip gain code, while the AGC gain is held constant. In one case according to one embodiment of the present invention, maximum VGA gain, minimum VGA gain, maximum digital gain, and minimum digital gain are each programmable or user settable values. Changing these values will alter the operational characteristic between the transition point where the VGA gain changes its slope from some gain rate to zero, and where the digital gain changes from a slope of zero to some positive gain rate always at gain division 2. The rate of change in the VGA gain and rate of change in the digital gain are approximately equal according to one embodiment of the present invention. This causes the crossing over of gain division 2 to be seamless, continuous, and unnoticed by the user. Note that maximum VGA gain+maximum digital gain=maximum chip gain, and minimum VGA gain+minimum digital gain=minimum chip gain.

Figure 6:
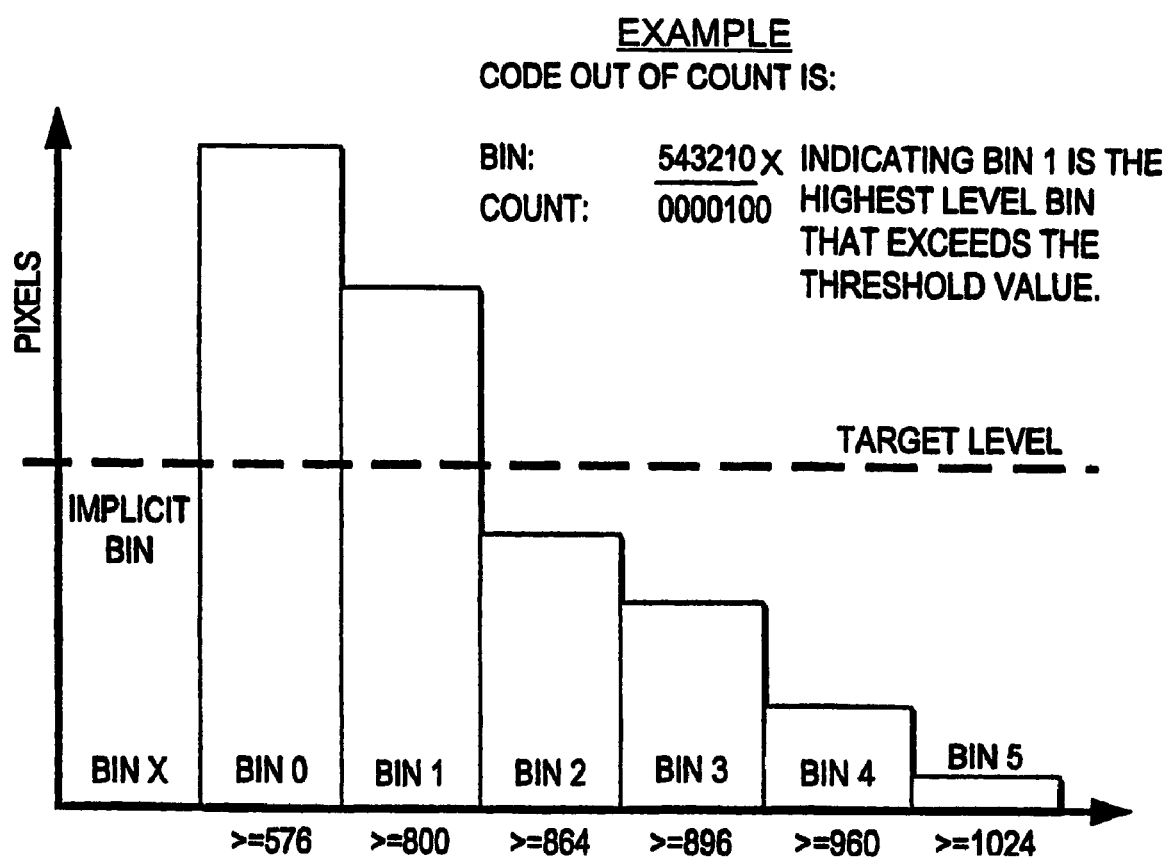
FIG. 6 is a histogram used in an automatic gain control circuit according to the present invention, for one frame of pixel data produced by an imager system.

Referring now to FIG. 6, there is shown a diagram of a histogram according to one embodiment of the present invention. Data from each frame captured by the camera system is categorized into particular bins of the histogram according to brightness level. Six explicit bins and one implicit bin are included. The applicable fixed value needed to increment each bin is shown below the chart. The target level a bin needs to exceed for a particular output of the histogram block is programmable through a target level register. The output of histogram circuit 192 is a 7 bit word, where only one bit is high, indicating the highest level bin that exceeds a target level. According to one example, a count of 0000100 indicates bin 1 is the highest level bin above the threshold.

Table 5 below is a diagram showing error signal generation by error circuit 193 according to the present invention. A 7 bit code is produced from histogram circuit 192, corresponding to one of the seven bins provided according to one embodiment of the present invention. From this, an appropriate error code is chosen and multiplied by a speed factor. The value of slew and speed are programmable. The slew value establishes the recovery speed from a very bright picture that saturated the output of the ADC.

TABLE 5

ERROR CODE GENERATION

| Bin | Error | Error Output |
|---|---|---|
| Bin 5 | SLEW | Error x (Speed Multiplier) |
| Bin 4 | −2 | |
| Bin 3 | −1 | |
| Bin 2 | 0 | |
| Bin 1 | 1 | |
| Bin 0 | 4 | |
| Bin X | 16 | |

One of three AGC windows can be selected through associated register according to one embodiment of the present invention. In particular, a full AGC window, a ¼ full AGC window, and a 1/16 full AGC window can be selected. Changing the area upon which AGC adjustments are applied permits better scene selection according to the present invention. Maximum gain, minimum chip gain, and maximum shutter gain are programmable according to the present invention. The user selects maximum gain to cause a scene to go dark at a certain low light level rather than gaining up to a noisy image. A minimum chip gain level prevents the output of the camera system from becoming saturated by the time the shutter gain is supposed to be active. If the output of the imager saturates, the shutter gain will never be engaged and particular bright scenes will be lost.

Figure 7:
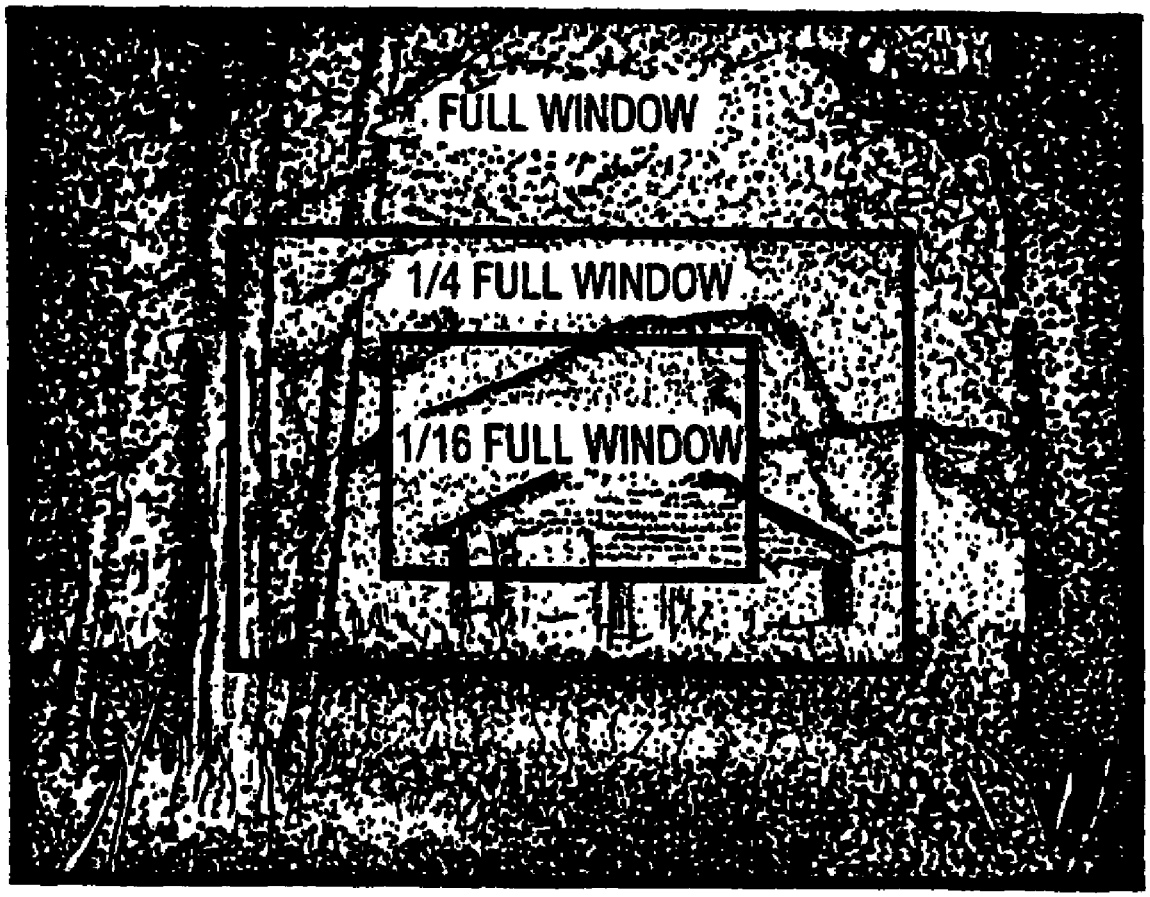
FIG. 7 is an image representation of multiple gain control windows according to the present invention.

Referring now to FIG. 7, there is shown an image representation of multiple gain control windows according to the present invention. More particularly, FIG. 7 is a picture of multiple automatic gain control windows which are settable according to the present invention. One of three AGC windows can be selected through an associated register according to one embodiment of the present invention. In particular, a full AGC window, a ¼ full AGC window, and a 1/16 full AGC window can be selected. Changing the area upon which AGC adjustments are applied permits better scene selection according to the present invention.

Figure 8A:
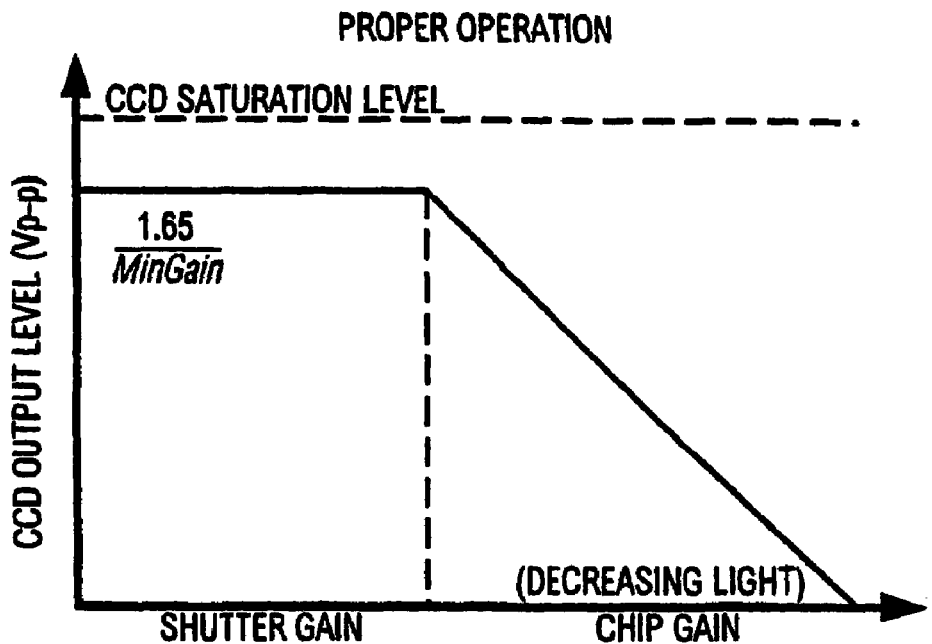
FIGS. 8A and 8B are respective diagrams of CCD output level as a function of gain under different saturation conditions, in accordance with the present invention.
Figure 8B:
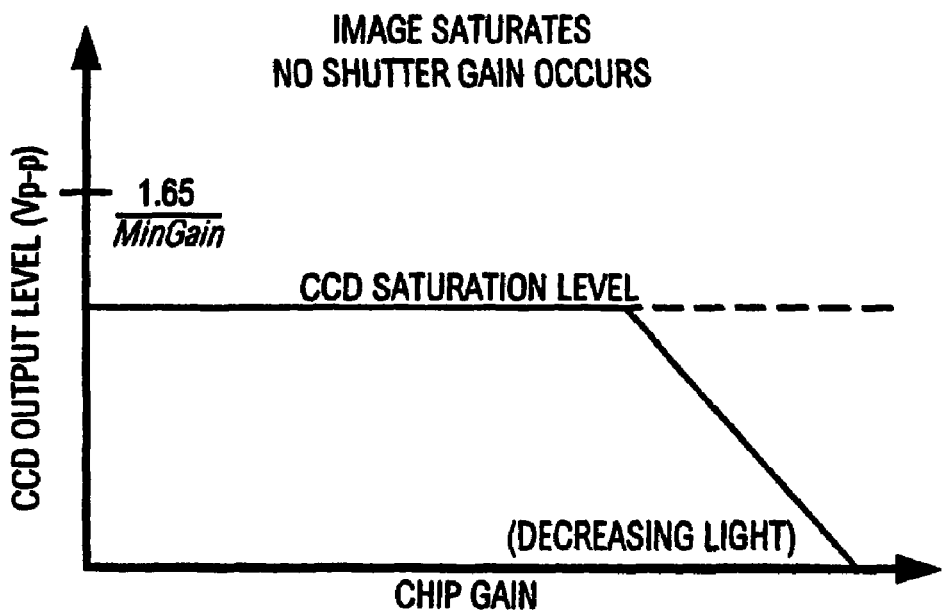

Referring now to FIGS. 8A and 8B, there are shown respective diagrams of CCD output level as a function of gain under saturation conditions, in accordance with the present invention. In particular, FIG. 8A is a diagram of operable gain operation according to the present invention, where minimum gain is set to prevent CCD camera system saturation. FIG. 8B is a diagram of an erroneous gain setting for minimum chip gain which causes the CCD camera system to saturate. On the other hand, FIG. 8A is a diagram of CCD output voltage level versus light intensity in operation according to the present invention, in which a level of minimum gain is set so that the CCD does not saturate.

Figure 9A:
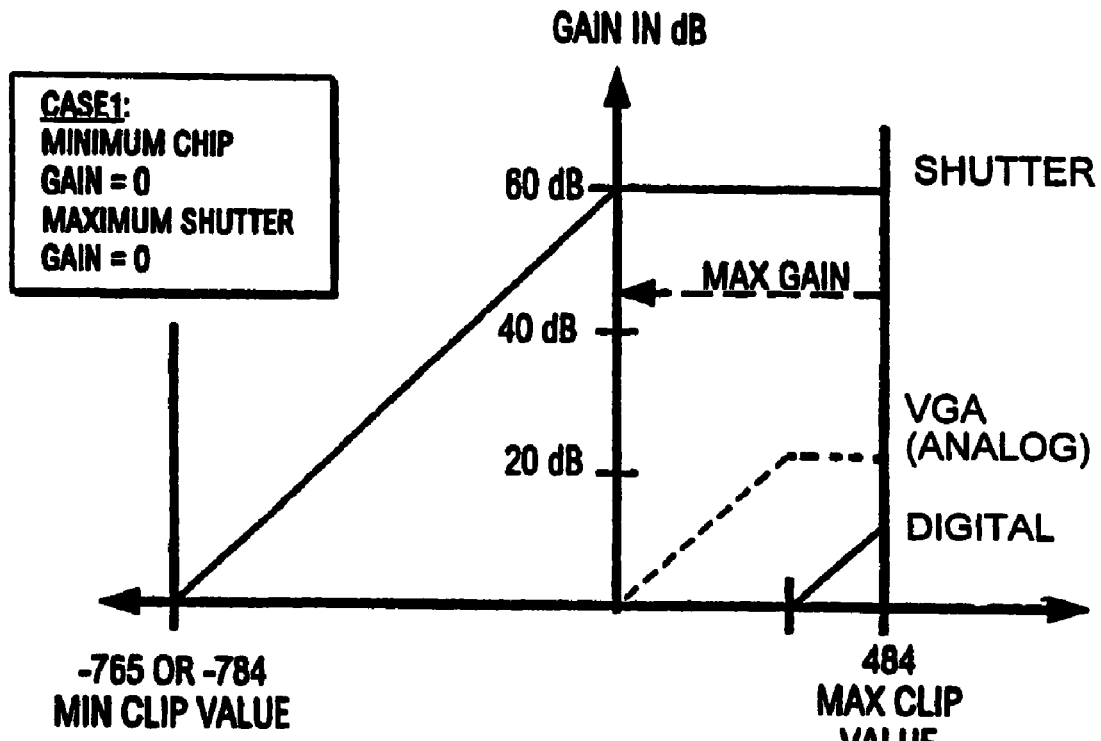
FIGS. 9A-9D are a plurality of diagrams of gain in dB as a function of digital gain code for minimum chip gain and maximum shutter gain conditions according to the present invention.
Figure 9B:
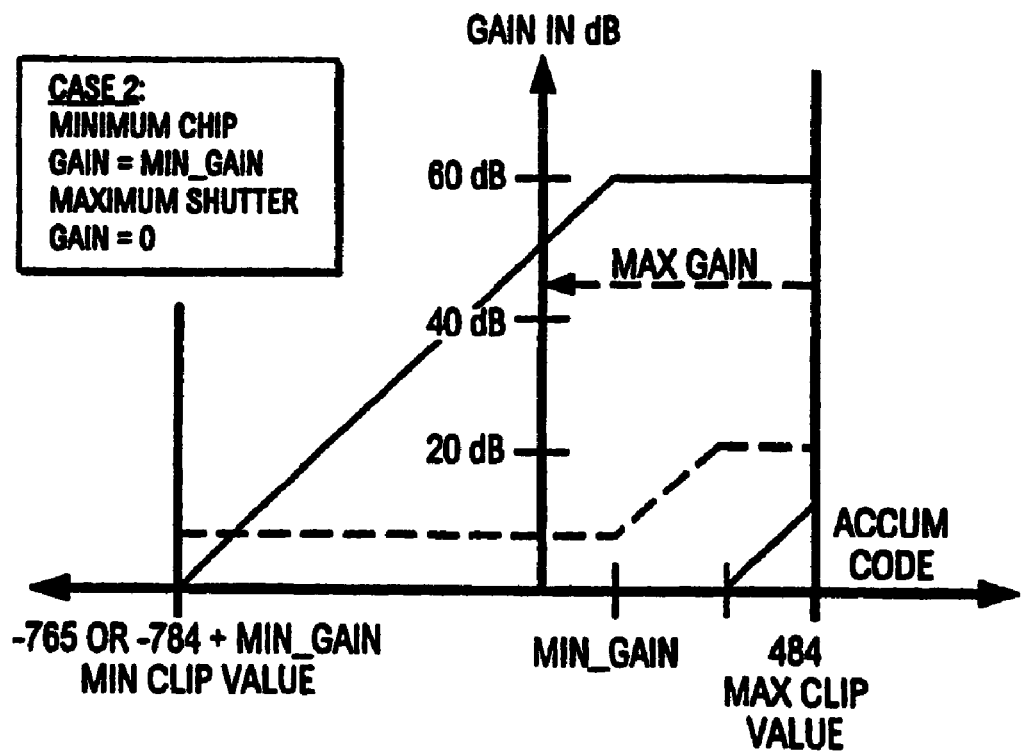
Figure 9C:
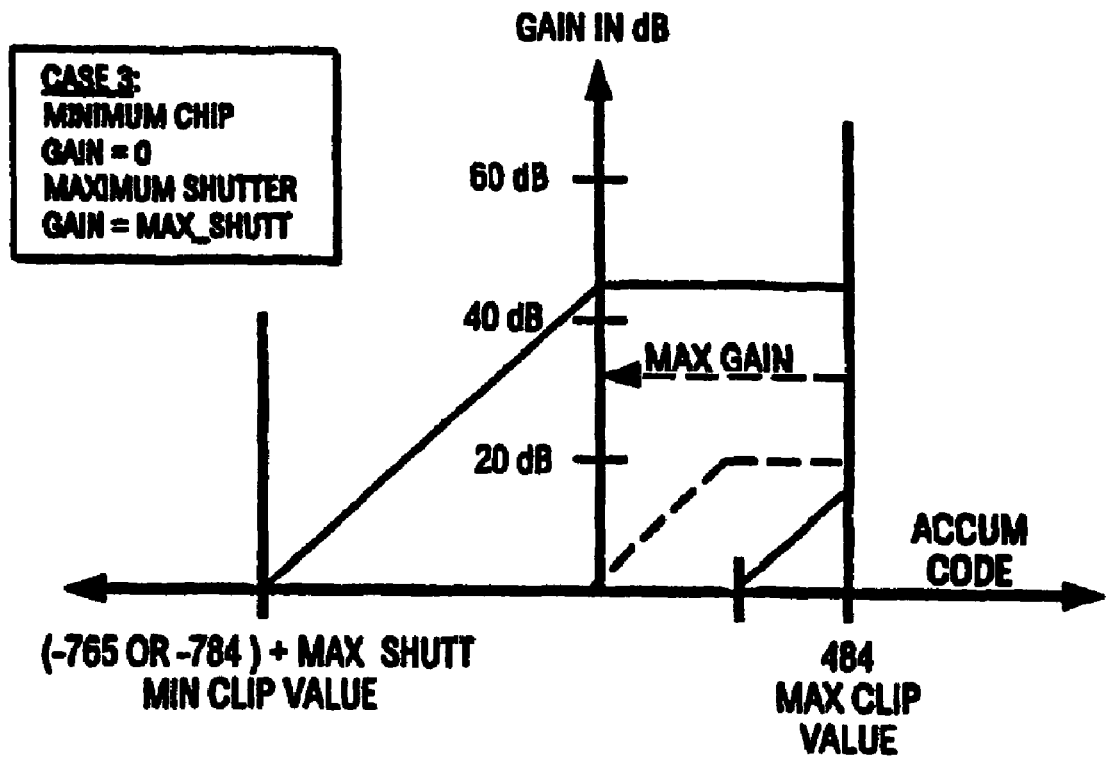
Figure 9D:
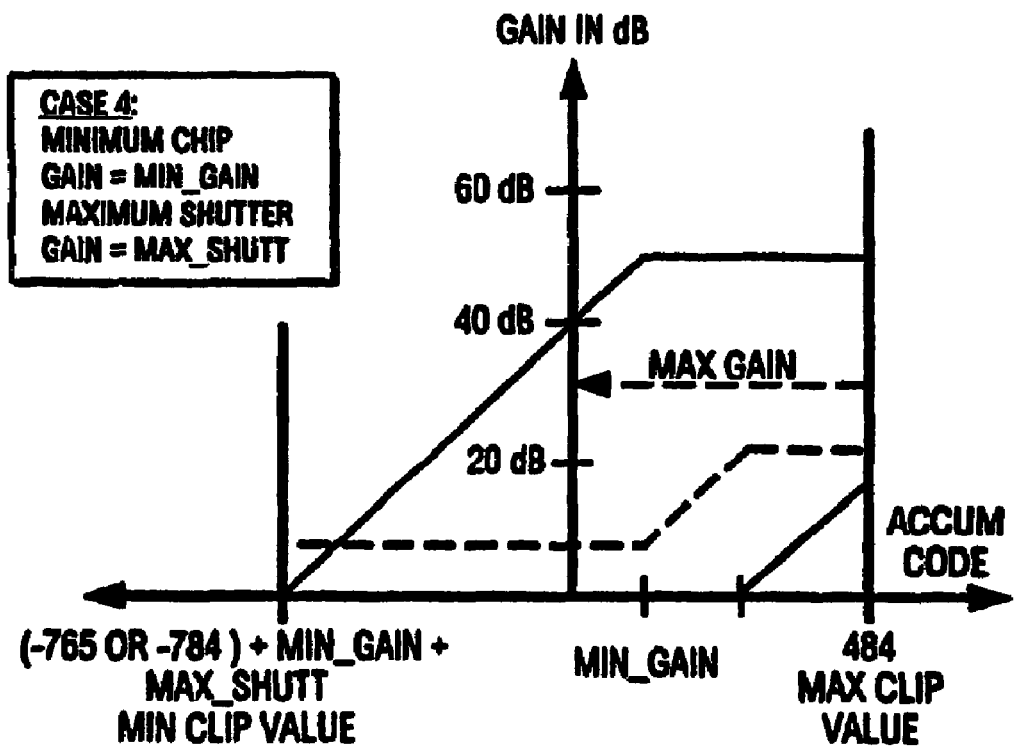

Referring now to FIGS. 9A-9D, there are shown a plurality of diagrams of gain in dB as a function of gain codes for minimum chip gain and maximum shutter gain conditions according to the present invention. In particular, FIGS. 9A-9D show how clipper circuit 95 limits the range of accumulator code according to the present invention, and how splitter circuit 97 distributes gain to applicable gain blocks according to the present invention. Specifically, FIG. 9A shows the result of minimum gain and maximum shutter gain set to 0. Without gain restrictions, there are 765 or 784 codes of shutter gain, depending upon whether the camera follows a NTSC or a PAL standard. The dark vertical lines indicate selected clipping values used by clipper circuit 95. There are two minimum clip values, depending upon whether an NTSC or a PAL camera is used. A maximum clip value is set according to one embodiment of the present invention by setting a maximum gain value with register 2CH, and this is 484 for the maximum gain range setting. In FIG. 9B, there is shown a restriction on the minimum gain (Min_Gain), but there is no restriction on the maximum shutter gain. The maximum chip value is still set by Max Gain as before. A seamless division of gain occurs with the transition between shutter gain and analog gain occurring at Min_Gain. According to FIG. 9C, there is no minimum gain restriction, and the maximum shutter gain is set to Max_Shutt. As a result, the minimum clip value has been increased by Max_Shutt, and the shutter gain range has been decreased. In FIG. 9D, restrictions have been placed on minimum gain (Min_Gain) and maximum shutter gain (Max_Shutt). The plot shows characteristics of both case 2 and case 3. The minimum clip value has now moved to the right by Min_Gain+Max_Shutt, and the transition between shutter gain and analog gain occurs at Min_Gain. The value Max Gain still sets the maximum clip value. Each of FIGS. 9A-9D shows shutter gain increasing from zero to a maximum level which it does not exceed. In the case of FIGS. 9B and 9C, a non-zero level of minimum chip gain is set. Accordingly, when shutter gain is zero, a total gain equal to the minimum chip gain is produced. The analog gain (or VGA gain) similarly has a maximum value which it cannot exceed. Accordingly, if the desired total gain exceeds the maximum shutter gain combined with the maximum analog gain, then the analog gain levels off (the shutter gain will already have leveled off), leaving all additional gain to be provided as digital gain, until a maximum gain point is reached. The threshold points at which additional gain is provided from another gain source are continuous, without abrupt notice to the user, according to the present invention.

Figure 10:
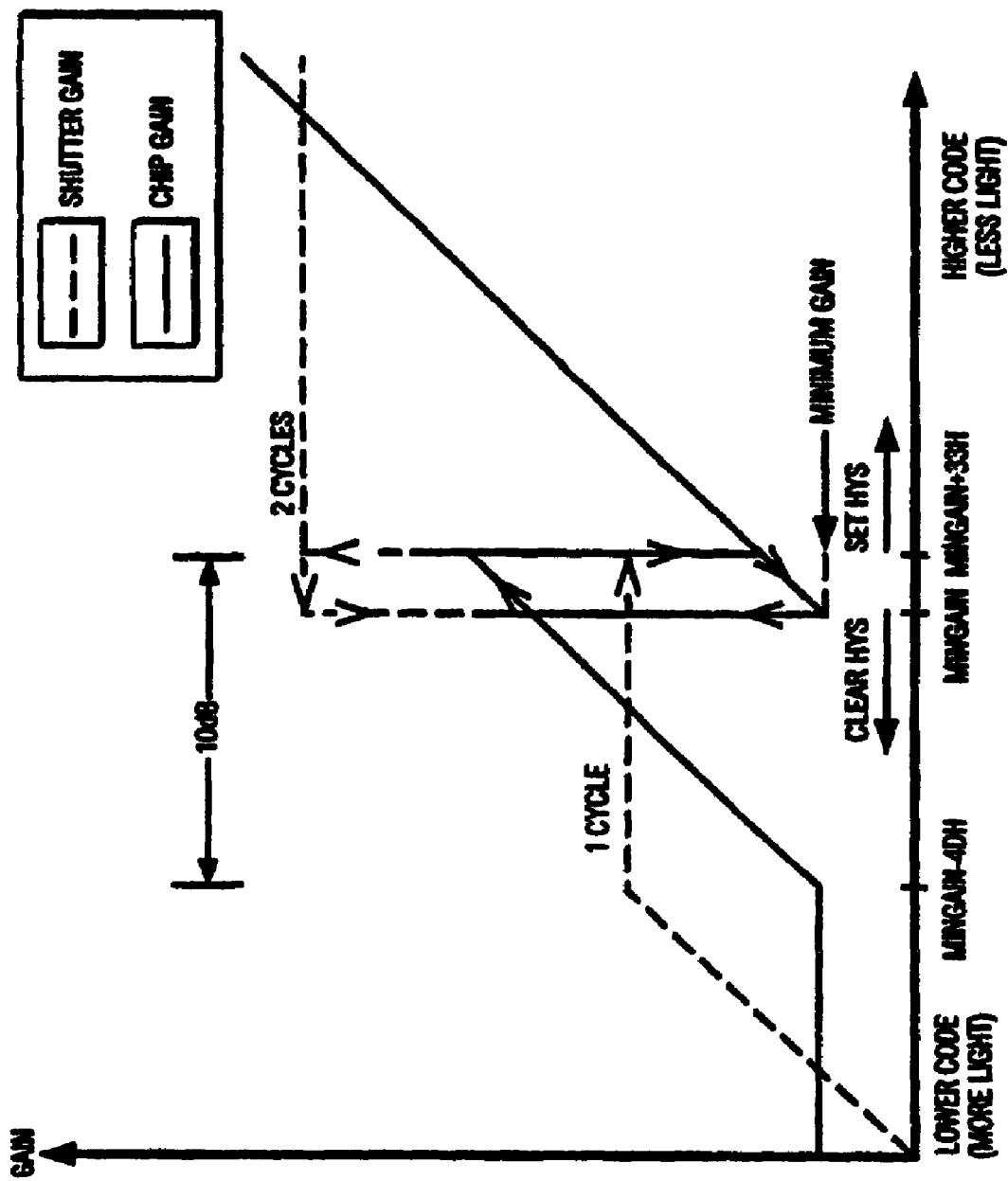
FIG. 10 is a diagram of gain with a flickerless setting having hysteresis in accordance with operation according to the present invention.

Referring now to FIG. 10, there is shown a diagram of gain with a flickerless setting having hysteresis in accordance with operation according to the present invention. In particular, FIG. 10 is a diagram of gain as a function of gain code with a flickerless setting established which includes a hysteresis loop. Flickerless modes are included according to the present invention to enable indoor operation with fluorescent lights. If the fluorescent lighting flickers at twice the frequency of the power supply frequency, it is averaged upon receipt by the camera system over an integer number of cycles to avoid flicker in the resulting video to be displayed. There are two possible flickerless settings for particular exposure times. One setting averages one cycle of the fluorescent lights and another averages two cycles of the fluorescent light. A hysteresis loop is used according to the present invention to prevent variations in gain from causing the shutter speed to jump back and forth between the one and two cycle settings. Such flickering would produce undesirable effects, since analog gain is difficult to set to match a 2× gain step exactly. Flickerless modes are possible for combinations of camera type (PAL or NTSC) and operation environments (PAL or NTSC). FIG. 10 shows a graphical representation of flickerless AGC operation according to the present invention.

The AGC control loop is selectively disabled according to the present invention and written to manually to circuit 96 along write input AGC_GAIN_WR. Writing to associated registers causes accumulator updating with a written value at the end of each frame. If the AGC loop is disabled by setting the associated register, the accumulator value changes will not occur until the loop is enabled or the accumulator is manually written to through associated registers. Once a new gain value is set, it is passed to splitter circuit 97 where appropriate gain values are established for shutter and chip gain according to the settings for minimum gain, maximum shutter gain, flickerless mode, PAL, and PAL environment.

Figure 11:
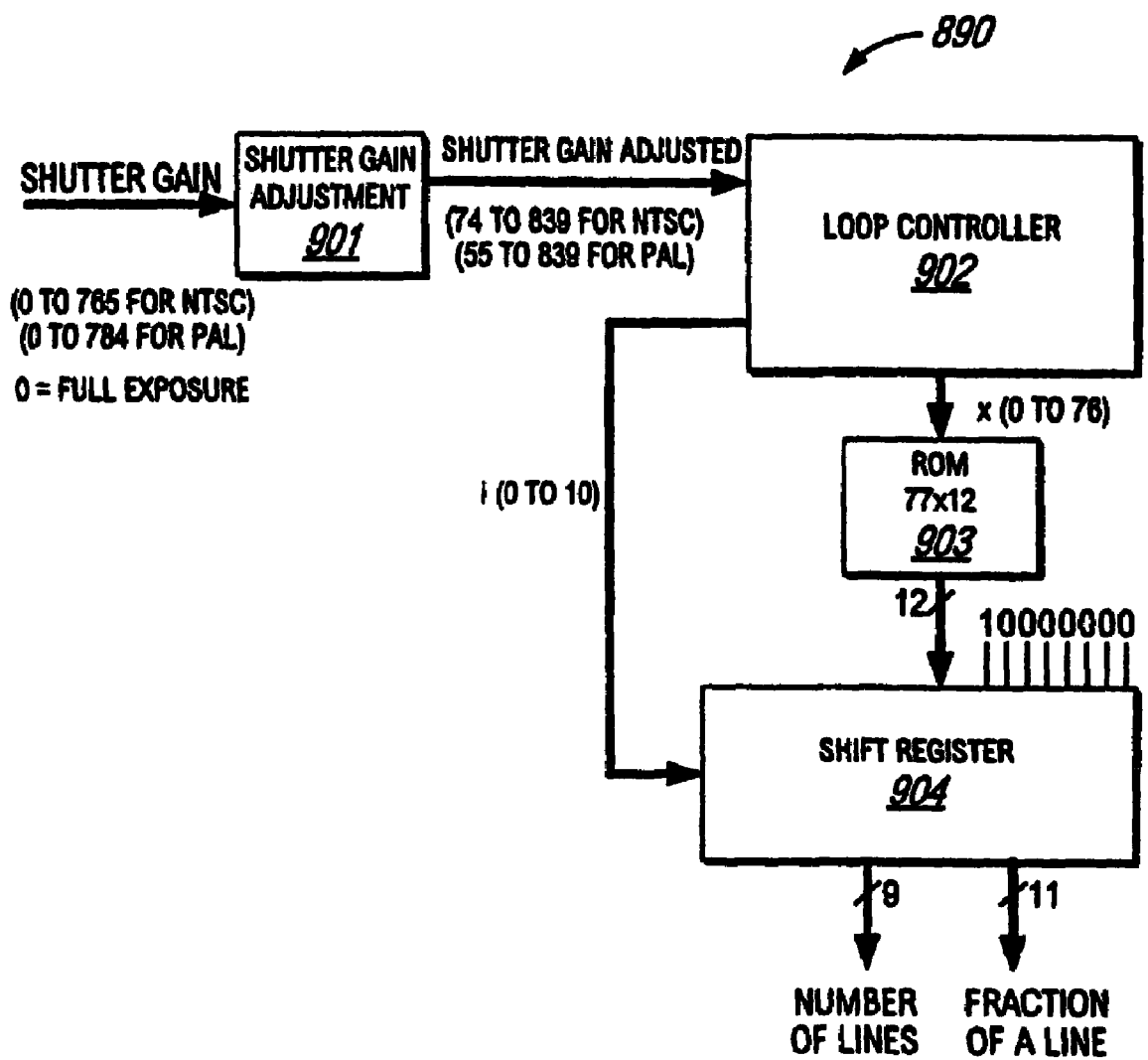
FIG. 11 is a block diagram of an AGC control loop line decoder (ACLLD) according to one embodiment of the present invention.

Referring now to FIG. 11, there is shown a block diagram of an AGC control loop line decoder (ACLLD) 890 according to one embodiment of the present invention. In particular, ACLLD 890 includes a shutter gain adjustment circuit (SGAC) 901, a loop controller 902, read-only-memory (ROM) 903, and a 20-bit shift register (SR) 904. SGAC 901 receives input values of shutter gain, and makes a PAL or NTSC adjustment to produce an adjusted shutter gain (ASG) which is also referred to as a shutter gain adjusted value. In particular, SGAC 901 adds the amount of 55 to each input value received according to the PAL standard, or adds 74 to each input shutter gain value received according to the NTSC standard. Input shutter gain values range from zero (0) to 765 according to the NTSC standard. Input shutter gain values range from zero (0) to 784 according to the PAL standard. The value of zero (0) in terms of input shutter gain values represents full exposure. Accordingly, by adding 55 or 74, depending upon the standard selected, an adjusted shutter gain level conforming either to PAL or NTSC is achieved. SGAC 901 is connected to loop controller 902 to provide an adjusted shutter gain level which is then converted into a form which specifies a number of lines and a fraction of a line. Loop controller 902 defines predetermined loop variables including a shift index value (SIV) "i" and a decremented ASG value (DASG) which has been reduced by 77 a number of "i" times, i.e., "x." The variable "i" is initially set to zero, while the value of "x" is decremented by loop controller 902 by a number of times the decrementation factor 77 is exceeded by the initial ASG value. The decremented value of "x", i.e., DASG, is provided by loop controller 902 to ROM 903 as an entry to produce a corresponding 12-bit output code, which is provided to shift register 904. The 12-bit code is shifted "i" times, based upon the final value of "i" which is produced after decrementation of "x" has been completed. Accordingly, SR 904 produces a 9-bit output defining a number of lines and an 11-bit output defining a fraction of a line, for each input 12-bit address. The ROM codes in ROM 903 establish predetermined exposure settings, so that predetermined flickerless modes can be accessed with applicable shutter gain values. ACLLD 890 implements according to one embodiment of the present invention a predetermined gain step size of 0.087 dB, which equals 6 dB/77. Since the number of lines of exposure is a factor of 2 smaller each 77 gain steps, a 77 code ROM 903 coupled to shift register 904 suffices to represent all desired gain values.

Figure 12:
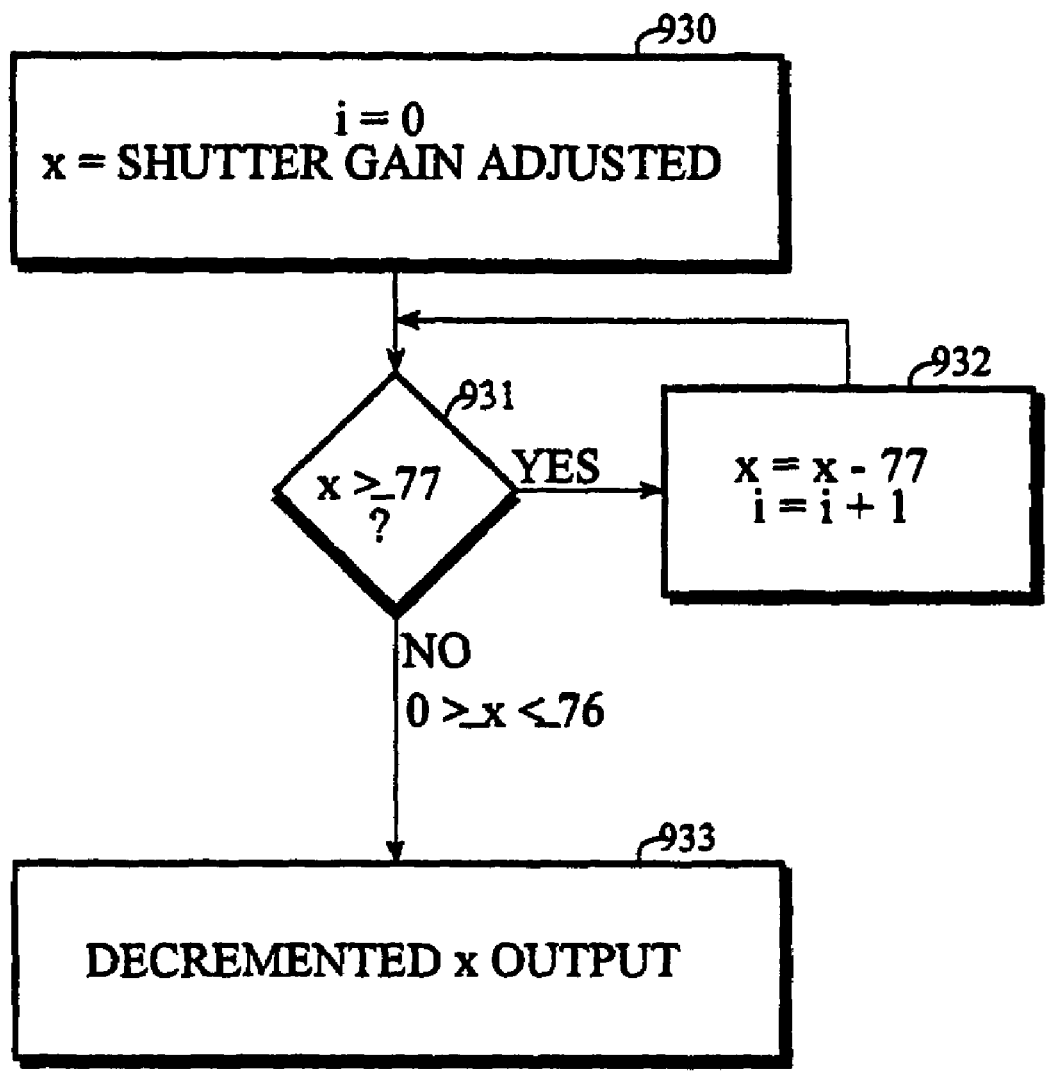
FIG. 12 is a flow diagram of the loop controller logic used by an ACLLD according to one embodiment of the present invention.

FIG. 12 is a flow diagram of the loop controller logic used by ACLLD according to one embodiment of the present invention. In particular, flow diagram 919 includes initially setting 930 a shift index value "i" equal to zero for a particular adjusted shutter gain (ASG) "x" (i.e., "shutter gain adjusted"). Next, a determination is made 931 (i.e., test 931) according to one embodiment of the present invention as to whether the value of the ASG is greater than or equal to a particular predetermined value, such as for example 77 in this case. If yes, the ASG is decremented 932 by the predetermined resolution value and test 931 is repeated. In addition to decrementing the ASG, the index value i is incremented by one integer value, permitting the number of times the ASG exceeds 77 to be tracked as an index of the amount of shift that should be applied by shift register 904 upon receipt of the resultant decremented ASG value, which will be an integer from zero to 76.

What is claimed is:
1. A method of gain control in an imaging system having a shutter, a digital gain circuit, and a CDS/VGA circuit, including:
   determining a total gain for an imaging system;
   receiving, by an automatic gain control (AGC) circuit having a gain splitter circuit, the determined total gain;
   splitting, by the gain splitter circuit, the determined total gain into distributed gain values which at least include a shutter gain, an analog (VGA) gain, and a digital gain; and
   determining the level of the shutter gain to be applied in the operation of the imaging system;
   determining the level of the analog (VGA) gain to be applied in the operation of the imaging system;
   determining the level of the digital gain to be applied in the operation of the imaging system;
   hierarchically adjusting the shutter gain, the analog (VGA) gain, and the digital gain; and
   wherein the shutter gain has maximum and minimum shutter gain values; and
   wherein the analog (VGA) gain and the digital gain remain at a constant level as the shutter gain is varied.
2. The method according to claim 1, wherein each gain setting for said imaging system is applied for the duration of a single frame.
3. The method according to claim 1 wherein the analog (VGA) gain has maximum and minimum analog gain values.
4. The method according to claim 1 wherein a chip gain has a maximum and a minimum gain value.
5. The method according to claim 1 wherein the digital gain has a maximum and a minimum value.
6. The method according to claim 1, wherein said constant level is user-settable.
7. A method of gain control in an imaging system having a shutter, a digital gain circuit, and a CDS/VGA circuit, including;
   determining a total gain for an imaging system;
   receiving, by art automatic gain control (AGC) circuit having a gain splitter circuit, the determined total gain;

splitting, by the gain splitter circuit, the determined total gain into distributed gain values which at least include a shutter gain, an analog (VGA) gain, and a digital gain; and determining the level of the shutter gain to be applied in the operation of the imaging system;

determining the level of the analog (VGA) gain to be applied in the operation of the imaging system;

determining the level of the digital gain to be applied in the operation of the imaging system;

hierarchically adjusting the shutter gain, the analog (VGA) gain, and the digital gain; and wherein the shutter gain has maximum and minimum shutter gain values; and wherein the shutter gain and the analog (VGA) gain remain at a constant level as the digital gain is varied.

8. The method according to claim 7, wherein said constant level is user-settable.

9. A method of gain control in an imaging system having a shutter, a digital gain circuit, and a CDS/VGA circuit, including:

determining a total gain for an imaging system;

receiving, by an automatic gain control (AGO) circuit having a gain splitter circuit, the determined total gain;

splitting, by the gain splitter circuit, the determined total gain into distributed gain values which at least include a shutter gain, an analog (VGA) gain, and a digital gain; and determining the level of the shutter gain to be applied in the operation of the imaging system;

determining the level of the analog (VGA) gain to be applied in the operation of the imaging system;

determining the level of the digital gain to be applied in the operation of the imaging system;

hierarchically adjusting the shutter gain, the analog (VGA) gain, and the digital gain; and wherein the shutter gain has maximum and minimum shutter gain values; and wherein the shutter gain and the digital gain remain at a constant level as the analog (VGA) gain is varied.

10. The method according to claim 7, wherein each gain setting for said imaging system is applied for the duration of a single frame.

11. The method according to claim 7 wherein the analog (VGA) gain has maximum and minimum analog gain values.

12. The method according to claim 7 wherein a chin gain has a maximum and a minimum gain value.

13. The method according to claim 7 wherein the digital gain has a maximum and a minimum value.

14. The method according to claim 9, wherein said constant level is user-settable.

15. The method according to claim 9, wherein each gain setting for said imaging system is applied for the duration of a single frame.

16. The method according to claim 9 wherein the analog (VGA) gain has maximum and minimum analog gain values.

17. The method according to claim 9 wherein a chip gain has a maximum and a minimum gain value.

18. The method according to claim 9, wherein the digital gain has a maximum and a minimum value.

* * * * *